(12) United States Patent
Priem et al.

(10) Patent No.: US 6,446,186 B1
(45) Date of Patent: Sep. 3, 2002

(54) METHOD, APPARATUS AND ARTICLE OF MANUFACTURE FOR MAPPING PHYSICAL MEMORY IN A VIRTUAL ADDRESS SYSTEM

(75) Inventors: Curtis Priem, Fremont; Don Bittel, San Jose, both of CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/428,597

(22) Filed: Oct. 27, 1999

(51) Int. Cl.[7] .............................................. G06F 12/00
(52) U.S. Cl. ...................... 711/206; 711/202; 711/207; 711/208; 711/209
(58) Field of Search ............................... 711/200–209; 712/228

(56) References Cited

U.S. PATENT DOCUMENTS

| 4,875,160 A | * | 10/1989 | Brown, III ................. 712/228 |
| 5,784,707 A | | 7/1998 | Khalidi et al. ............... 711/206 |
| 5,873,127 A | | 2/1999 | Harvey et al. ............... 711/206 |
| 5,897,664 A | | 4/1999 | Nesheim et al. ............ 711/206 |
| 6,212,613 B1 | * | 4/2001 | Belair ......................... 711/207 |

* cited by examiner

*Primary Examiner*—Than Nguyen
(74) *Attorney, Agent, or Firm*—Silicon Valley IP Group; Kevin J. Zilka

(57) ABSTRACT

A method, apparatus and article of manufacture are provided for minimizing the number of look-ups in a page table entry (PTE) data structure during mapping of virtual addresses to physical addresses when the physical addresses consist of contiguous addresses. First, a primary virtual address in a PTE data structure is accessed for mapping physical memory. Next, it is determined whether a primary physical address corresponding to the accessed primary virtual address is associated with a physical page having at least one contiguous physical page. If it is determined that such contiguous physical page exists, information relating to both the primary virtual address and any virtual and physical contiguous addresses in the PTE data structure is retrieved in a single look-up.

42 Claims, 5 Drawing Sheets

METHOD, APPARATUS AND ARTICLE OF MANUFACTURE FOR MAPPING PHYSICAL MEMORY IN A VIRTUAL ADDRESS SYSTEM

FIELD OF THE INVENTION

The present invention relates generally to processing computer data and, more particularly, to mapping physical addresses in a virtual address system.

BACKGROUND OF THE INVENTION

One of the elements within a typical computer system is a memory management unit (MMU). The MMU includes hardware and software that work in conjunction with a processing unit (i.e. CPU) of the computer system when data is retrieved from memory. In order to allow more effective retrieval of data such as image data from memory, it is conventional for the processing unit to employ "virtual" addresses which in turn correspond to physical addresses in physical memory, as part of a virtual address system.

When accessing data, the processing unit generates virtual addresses to access physical memory. Before these virtual addresses can be used to access data in physical memory, they must be translated into physical addresses. It is the MMU that controls the allocation and use of physical memory and provides the processing unit with mapping information which enables access to the data in the physical memory.

Prior Art FIG. 2A illustrates one example of mapping virtual addresses 100 to segments of physical memory 102 commonly referred to as "pages" 104. A page 104 is a block of memory typically having a predetermined size. The specific size of a page 104 varies from system to system. A common page size is 4096 bytes.

The MMU maintains tables of mapping information, or "page tables", that keep track of where each page of virtual memory is located in physical memory. The processing unit uses this mapping information when it translates virtual addresses to physical addresses. To this end, the mapping of virtual addresses through page tables in a virtual address system provides a large virtual address space, and allows programs to run on hardware with smaller physical memory configurations.

An example of a page table is shown in Prior Art FIG. 2B. The page table 200 of Prior Art FIG. 2B contains Page Table Entries (PTEs) 202, each one of which defines a mapping between a single virtual page and a physical page of memory by providing a physical address 204 of the physical page of memory. In addition to containing the physical address, the page table 200 may also include a plurality of flags 206 as a component of each PTE 202. Examples of such flags 206 may include a lock, read, write, and/or page present flag.

Thus a given virtual page of memory is "mapped" to a page of physical memory by a specific PTE. The PTE is thus capable of "mapping" the virtual page to a physical page of memory.

The processing unit must frequently access the contents of a PTE as a consequence of managing virtual addresses and physical memory. In particular, the processing unit must access a PTE every time a virtual address must be mapped to a specific given physical page of memory. In the case of processing graphics data, and more particularly 3-D graphics data, such constant accessing of the page table becomes especially burdensome on the processing unit, taking a significant portion of the unit's computational cycles.

There is therefore a need for a system that allows for more efficient mapping of physical memory in a virtual address system by minimizing a number of look-ups in a PTE data structure during the mapping process.

DISCLOSURE OF THE INVENTION

A method, apparatus and article of manufacture are provided for minimizing the number of look-ups in a page table entry (PTE) data structure during mapping of physical memory. First, a primary virtual address in a PTE data structure is accessed. Next, it is determined whether a primary physical address corresponding to the accessed primary virtual address in the PTE data structure is associated with a physical page having at least one contiguous physical page.

Such determination may be facilitated by using headers for each of the entries in the PTE data structure. These headers may be read upon accessing the primary physical address in the PTE data structure in order identify whether any contiguous physical pages exist and, if so, how many and where they are located.

If it is determined that at least one contiguous physical page exists, information relating to both the primary virtual address, primary physical address, and any contiguous physical pages in the PTE data structure is retrieved in a single look-up. It can thus be appreciated that a look-up process in a PTE data structure having physical pages with a significant amount of contiguity will be accelerated in a very desirable manner. Such acceleration is a direct result of fewer required look-ups in the PTE data structure and more information being retrieved during each look-up.

If it is determined that the primary physical address is not associated with any contiguous physical pages, normal operation is carried out and information is only retrieved relating to the primary physical address in the PTE data structure.

In the case where the primary physical address is not associated with any contiguous pages, the information that is retrieved may include bits representative of the primary physical address. If, however, at least two contiguous pages are identified, the retrieved information may include information for allowing the calculation of bits representative of the contiguous physical addresses and the corresponding range of the virtual addresses. For example, the retrieved information may include a minimum and maximum limit of the virtual or physical address range.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 2A:
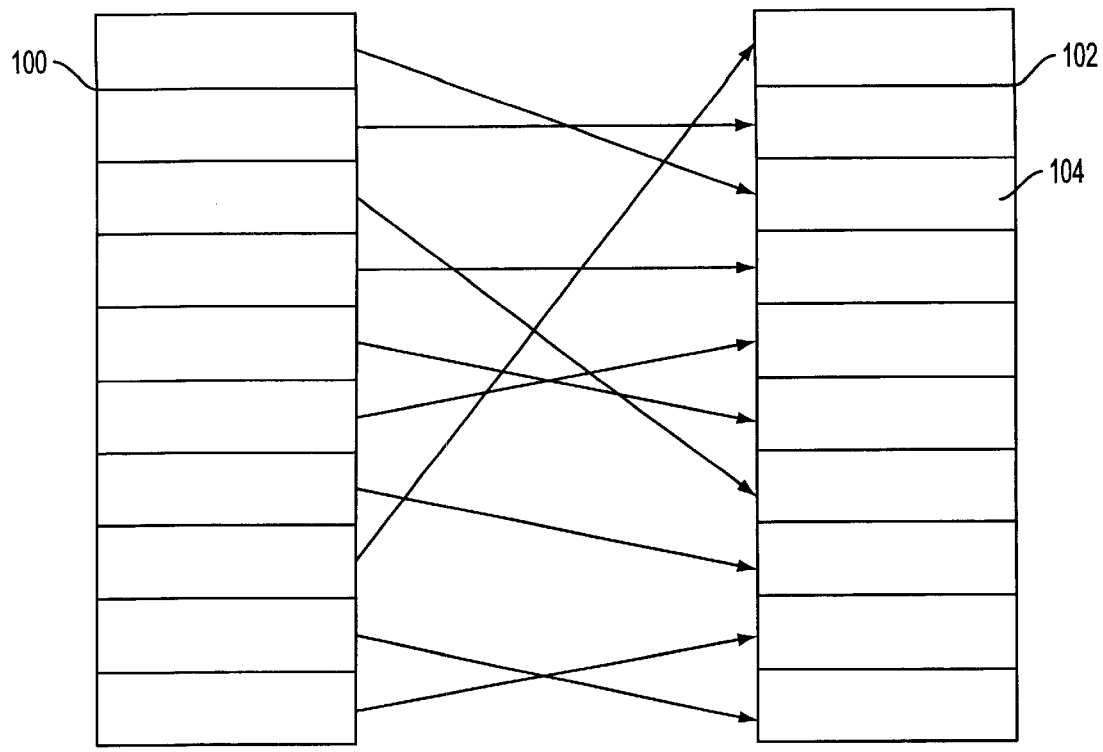
FIG. 2A is a method of mapping virtual memory and physical memory of the prior art.
Figure 2B:
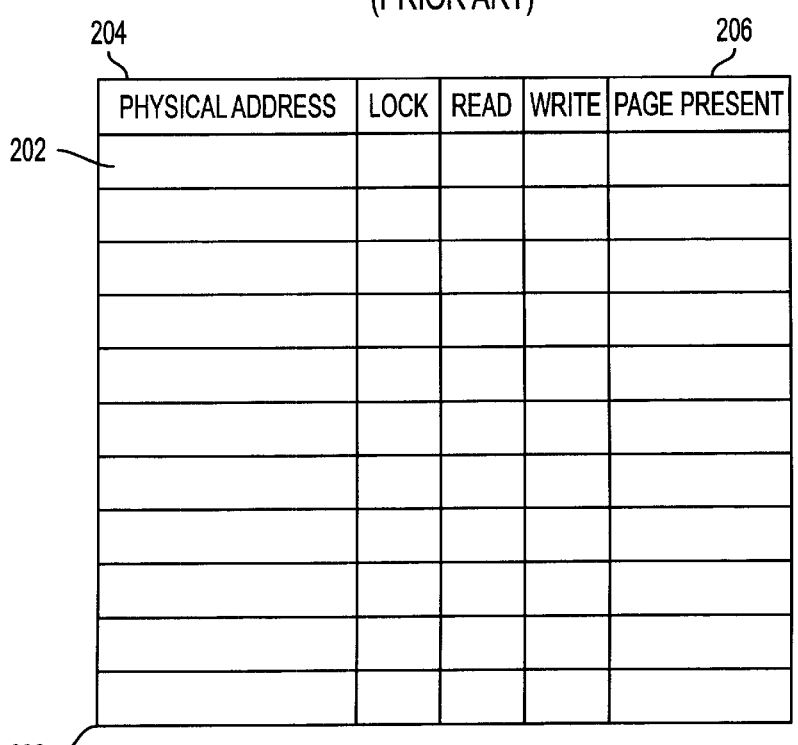
FIG. 2B is an illustration of a page table entry (PTE) data structure of the prior art.
Figure 3:
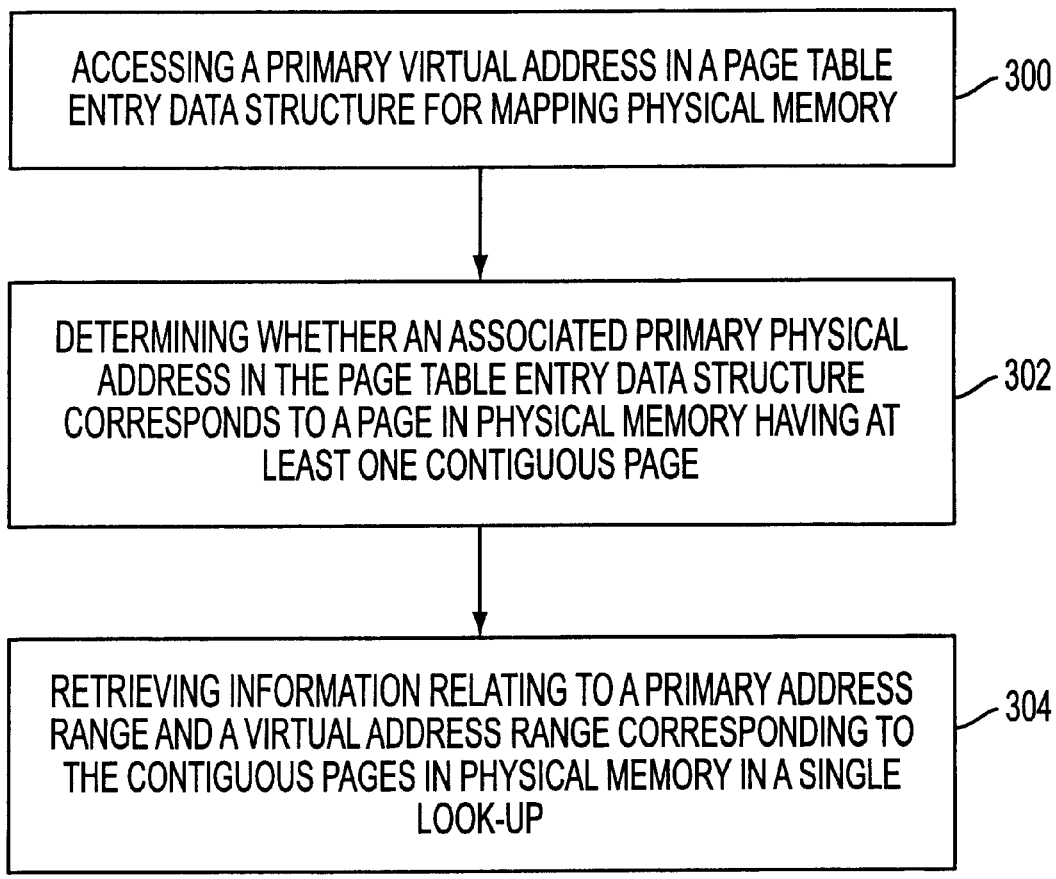
FIG. 3 is a flowchart illustrating a method of performing look-ups in a PTE data structure in accordance with one embodiment of the present invention.
Figure 4:
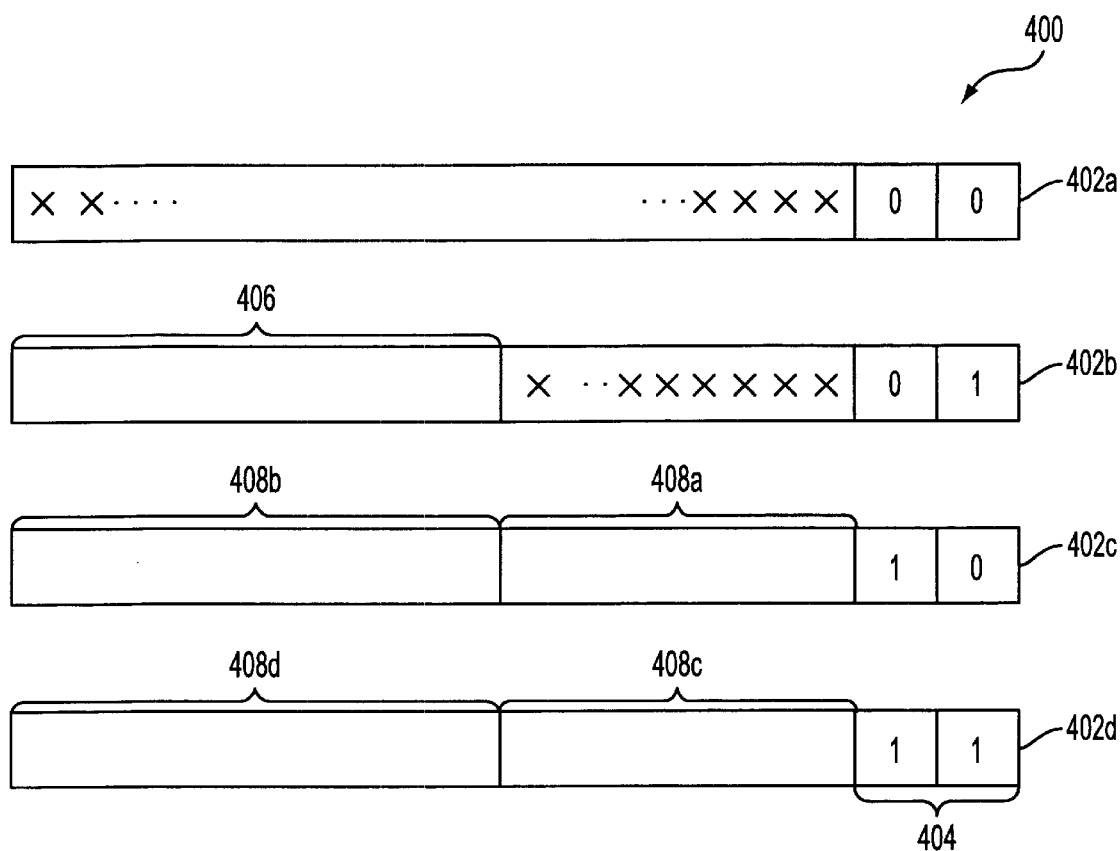
FIG. 4 is an illustration of various possible entries of a PTE data structure of the present invention that may be accessed via the method of FIG. 3.
Figure 5:
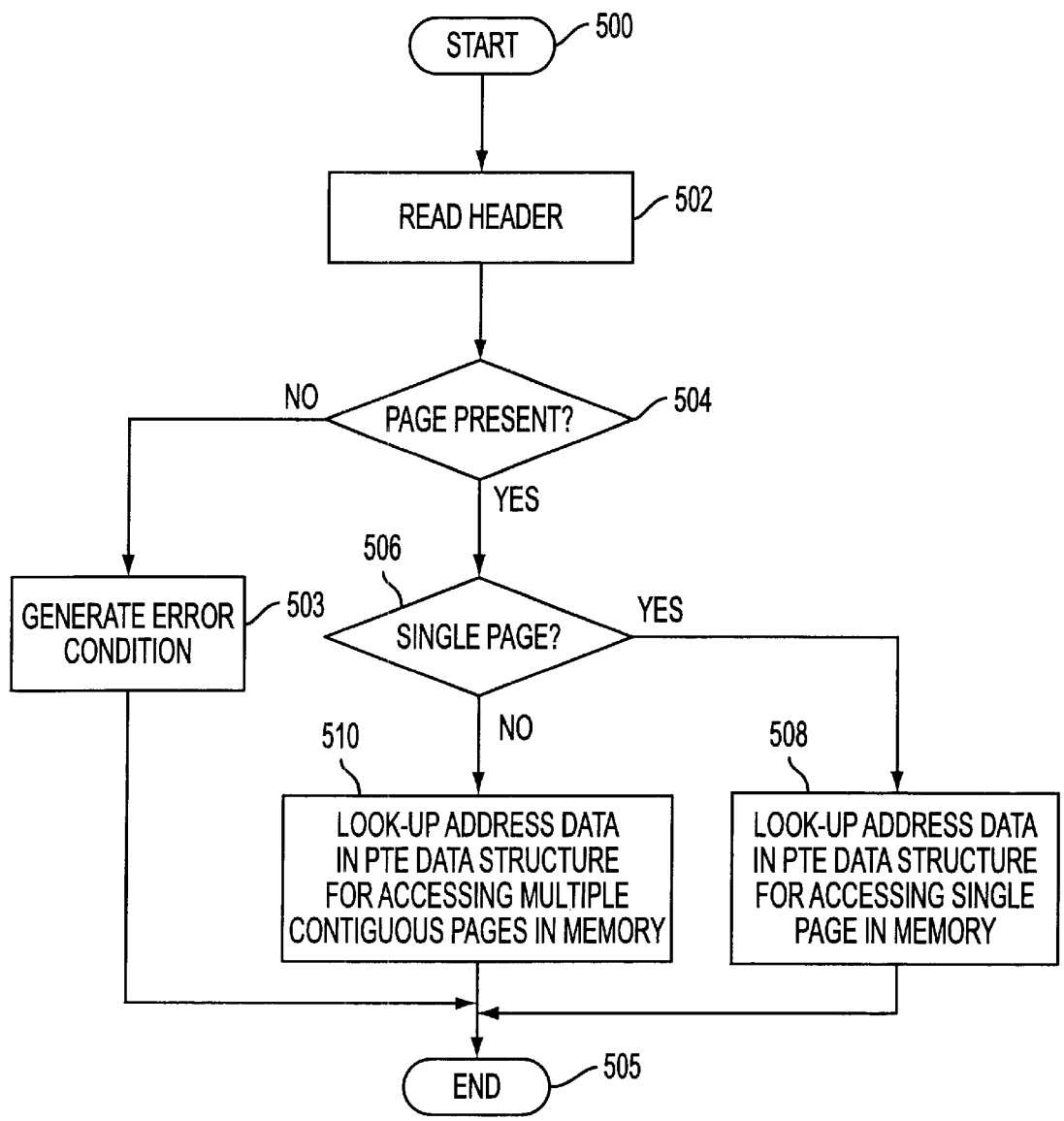
FIG. 5 is a more detailed flowchart illustrating the method of the present invention for performing look-ups in the PTE data structure shown in FIG. 4.

FIGS. 2A and 2B illustrate a prior art virtual address system for mapping virtual addresses to physical addresses. With reference now to FIGS. 3 through 5, a system of the present invention is provided for minimizing a number of look-ups in a Page Table Entry (PTE) data structure during mapping of physical memory from a virtual address.

FIG. 3 illustrates a look-up minimization technique of one embodiment of the present invention. As shown, a virtual address in a PTE data structure is first accessed, as indicated in operation 300. The access is made by a Memory Management Unit (MMU) per the instructions of a processing unit (i.e. CPU). It should be noted that in the present description, the virtual address which the MMU is initially called to access is referred to as the "primary virtual address" and the address of the physical page which is generated for the primary virtual address is referred to as the "primary physical address".

Figure 1:
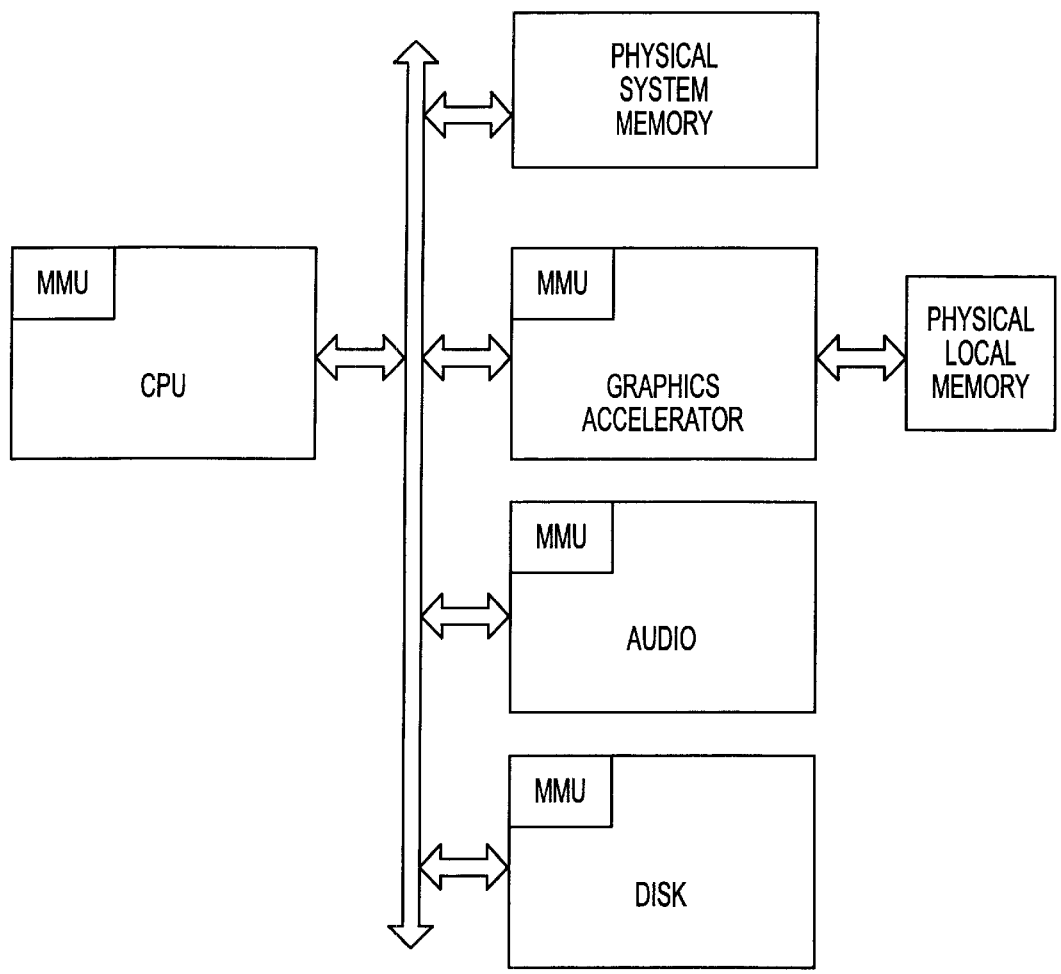
FIG. 1 is a block diagram of a computer system with processing units capable of supporting a virtual address system.

In one embodiment of the present invention, the PTE data structure is a component of an I/O device. See FIG. 1. Such I/O device may include a graphics accelerator module, audio processing unit, disk controller, or any other type of processing unit. The device may also be equipped with any type of hardware and/or software logic for carrying out the operations of the present invention. For example, an application specific integrated circuit (ASIC) may be employed or, in the alternative, a CPU may be used as set forth hereinabove with associated random access memory (RAM) or any other computer readable medium for storing a computer program including instructions for carrying out the necessary operations.

After the primary virtual address's PTE in the PTE data structure is accessed in operation 300, it is next determined whether the corresponding primary physical address is a part of at least two contiguous pages in operation 302. The manner in which such determination is made will be set forth in greater detail with reference to FIG. 4. Upon it being determined in operation 302 that there are at least two contiguous pages, information relating to both the primary virtual address range and the contiguous physical address range are retrieved in a single look-up. Note operation 304.

Contiguous physical addresses in the PTE data structure include physical pages which are adjacent in physical memory. Such contiguity may result from various factors such as how the physical memory is allocated. By retrieving contiguous physical addresses with the primary virtual addresses, a fewer number of look-ups in the PTE data structure are required and more information is retrieved during each look-up. Only one look-up is required for each contiguous region of physical pages as opposed to one look-up for each physical page in the prior art.

FIG. 4 illustrates an example of a PTE data structure 400 having multiple PTEs 402a, 402b, 402c, and 402d. It should be noted that a size of such PTEs 402 may be any desired size, i.e. 32 bits, 64 bits, etc. As mentioned earlier, when a look-up for a primary virtual address is performed in the PTE data structure 400, it must be determined whether the associated primary physical address in the PTE data structure 400 corresponds to one of at least two contiguous physical pages.

In order to accomplish this task, headers 404 are included with each of the PTEs 402 of the PTE data structure 400. These headers 404 may be read upon accessing a primary physical address in the PTE data structure 400 in order identify whether any contiguous addresses exist.

To extract such information from the headers 404, each of the headers 404 of the PTEs 402 includes a first set of bits, allocated to indicate one of a plurality of potential possibilities. In one embodiment, two bits may be allocated as shown in FIG. 4, thus rendering four possibilities, or combinations.

For example, a first combination of the first set of bits 404 may be dedicated to indicate that no physical address exists for mapping purposes. Such case is illustrated as 402a in FIG. 4. As shown, the remaining bits of the PTE 402 are "don't care" bits since no physical address is available. Such unavailability of the physical address may be caused by any number of factors such as the page associated with the physical address being used by another user, or not being locked down, fixed, etc.

A second combination of the first set of bits 404 may indicate a situation where the desired primary physical address exists, but does not have any contiguous pages. Such case is illustrated as 402b in FIG. 4. In such case, a second set of bits 406 is allocated for identifying the primary physical address. It should be noted that the primary physical address may be adjusted by an operation, i.e. subtraction, etc., with another variable such as an offset. The remaining bits are "don't care" bits since they are unused. As an option, such "don't care" bits may be used for read, write, or lock flags.

The remaining two combinations of the first set of bits 404, or header object, are dedicated to the situation where contiguous physical pages exist for a primary virtual address during a look-up. Such case is illustrated as examples 402c and 402d in FIG. 4. In such situation, two PTEs 402c and 402d are used in combination to supply sufficient information during a look-up which in turn may be used to describe the virtual address range, and to access the primary physical address and any associated contiguous pages in physical memory.

In order to provide the foregoing necessary information, each of the PTEs 402c and 402d contain unique information based on an index of the PTE 402c or 402d. Such information is provided in a third set of bits 408a–d, or a contiguous address identifier object, to be used to identify the beginning address and range size of the contiguous physical pages and the beginning address and range size of the virtual address range. From this information, the address range of the virtual addresses can be calculated. When an access is made to the primary virtual address within this range the processing unit can use the physical address information already looked-up. The location (delta) within the virtual address range can be calculated by subtracting the primary virtual address from the beginning of the virtual address range. Also from this information, the address range of the physical contiguous pages can be calculated. The offset with the contiguous physical pages can be calculated by adding the delta to the beginning address of the contiguous physical pages. The offset is the physical address of the page that the access is made to.

There are many ways to store the beginning address and range size of the contiguous physical pages and the beginning address and range size of the virtual address range. In one embodiment, the retrieved information may include a minimum (or delta to the minimum) and maximum (or delta to the maximum) addresses of the virtual address range and the minimum (or delta to the minimum) or maximum (or delta to the maximum) physical address of the page range. The size of the virtual address range can be calculated by subtracting the minimum virtual address from the maximum virtual address.

In another embodiment, the retrieved information may include a minimum (or delta to the minimum) or maximum (or delta to the maximum) address of the virtual address range and the minimum (or delta to the minimum) and maximum (or delta to the maximum) physical addresses of the page range. The size of the virtual address range can be calculated by subtracting the minimum physical address from the maximum physical address.

In yet another embodiment, the retrieved information may include a minimum (or delta to the minimum) or maximum (or delta to the maximum) address of the virtual address range, the minimum (or delta to the minimum) or maximum (or delta to the maximum) physical address of the page range, and the size of the virtual and physical address ranges.

FIG. 5 shows the operations of FIG. 3 in a more detailed manner. Upon starting in 500, the set of bits 404, or header object, of a subject PTE 402 is read in operation 502. Based on the information read from the header 404, it is first determined in decision 504 whether the desired primary physical address, or page, is present in the appropriate PTE 402a of the PTE data structure 400.

If a page is not present, no information is retrieved, an error condition such as an interrupt is generated in operation 503, and the method is terminated in 505. If, on the other hand, at least one page is identified, it is determined in decision 506 whether a single or multiple pages are present. In other words, it is determined whether contiguous addresses exist. Such determination is also based on the first set of bits 404, or header object, as set forth in FIG. 4.

If only a single page is present, the primary physical address in the PTE data structure 400 is accessed in operation 508 for mapping the primary virtual address to physical memory. Or, in other words, a look-up is performed for accessing a single page in memory. In the case where multiple pages are present, a look-up is performed for mapping multiple contiguous virtual pages to multiple contiguous physical pages in memory, as indicated in operation 510.

When address data for multiple contiguous pages is read from the PTE data structure 400, the minimum virtual address, minimum physical address, and the size of the contiguous address range is calculated. When a processing unit accesses memory, the primary virtual address is compared to the last looked-up minimum virtual address and size to see if the primary virtual address is within the current range. If it is, the last looked-up minimum physical address and range is used to calculate the primary physical address, thus not requiring that a new PTE 402 is read from memory.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for minimizing a number of look-ups in a page table entry data structure during mapping of a virtual address to a physical address, comprising the acts of:
   (a) accessing a virtual address in a page table entry data structure of a processing unit;
   (b) determining whether the virtual address in the page table entry data structure has two or more contiguous physical addresses; and
   (c) retrieving information from the page table entry data structure for minimizing a number of look-ups in the page table entry data structure, if it is determined that the virtual address in the page table entry data structure has two or more contiguous physical addresses.

2. The method as recited in claim 1, wherein the information includes a size of virtual and physical address ranges.

3. The method as recited in claim 1, wherein the information relates to a virtual address range and includes a minimum virtual address.

4. The method as recited in claim 3, wherein the information relating to the virtual address range includes a difference between the virtual address and the minimum virtual address.

5. The method as recited in claim 1, wherein the information relates to a virtual address range and includes a maximum virtual address.

6. The method as recited in claim 5, wherein the information relating to the virtual address range includes a difference between the virtual address and the maximum virtual address.

7. The method as recited in claim 1, wherein the information relates to a physical address range and includes a minimum physical address.

8. The method as recited in claim 7, wherein the information relating to the physical address range includes a difference between the physical address and the minimum physical address.

9. The method as recited in claim 1, wherein the information relates to a physical address range and includes a maximum physical address.

10. The method as recited in claim 9, wherein the information relating to the physical address range includes a difference between the physical address and the maximum physical address.

11. The method as recited in claim 1, and further comprising the act of determining if a later virtual address is within a virtual address range associated with the information.

12. The method as recited in claim 11, and further comprising the act of accessing the page table entry data structure again when the later virtual address is not within the virtual address range, and using the information when the later virtual address is within the virtual address range.

13. A computer program embodied on a computer readable medium for minimizing a number of look-ups in a page table entry data structure during mapping of a virtual address to a physical address, comprising:
   (a) a code segment for accessing a virtual address in a page table entry data structure of a processing unit;
   (b) a code segment for determining whether the virtual address in the page table entry data structure has two or more contiguous physical addresses; and
   (c) a code segment for retrieving information from the page table entry data structure for minimizing a number of look-ups in the page table entry data structure, if it is determined that the virtual address in the page table entry data structure has two or more contiguous physical addresses.

14. The computer program as recited in claim 13, wherein the information includes a size of virtual and physical address ranges.

15. The computer program as recited in claim 13, wherein the information relates to a virtual address range and includes a minimum virtual address.

16. The computer program as recited in claim 15, wherein the information relating to the virtual address range includes a difference between the virtual address and the minimum virtual address.

17. The computer program as recited in claim 13, wherein the information relates to a virtual address range and includes a maximum virtual address.

18. The computer program as recited in claim 17, wherein the information relating to the virtual address range includes a difference between the virtual address and the maximum virtual address.

19. The computer program as recited in claim 13, wherein the information relates to the physical address range and includes a minimum physical address.

20. The computer program as recited in claim 19, wherein the information relating to the physical address range includes a difference between the physical address and the maximum physical address.

21. The computer program as recited in claim 13, wherein the information relates to a physical address range and includes a minimum physical address.

22. The computer program as recited in claim 21, wherein the information relating to the physical address range includes a difference between the physical address and the maximum physical address.

23. The computer program as recited in claim 13, and further comprising a code segment for determining if a later virtual address is within a virtual address range associated with the information.

24. The computer program as recited in claim 23, and further comprising a code segment for accessing the page table entry data structure again when the later virtual address is not within the virtual address range, and a code segment for using the information when the later virtual address is within the virtual address range.

25. An apparatus for minimizing a number of look-ups in a page table entry data structure during mapping of a virtual address to a physical address, comprising:
(a) logic for accessing a virtual address in a page table entry data structure of a processing unit;
(b) logic for determining whether the virtual address in the page table entry data structure has two or more contiguous physical addresses; and
(c) logic for retrieving information from the page table entry data structure for minimizing a number of look-ups in the page table entry data structure, if it is determined that the virtual address in the page table entry data structure has two or more contiguous physical addresses.

26. The apparatus as recited in claim 25, wherein the information includes a size of virtual and physical address ranges.

27. The apparatus as recited in claim 25, wherein the information relates to a virtual address range and includes a minimum virtual address.

28. The apparatus as recited in claim 27, wherein the information relating to the virtual address range includes a difference between the virtual address and the minimum virtual address.

29. The apparatus as recited in claim 25, wherein the information relates to a virtual address range and includes a maximum virtual address.

30. The apparatus as recited in claim 29, wherein the information relating to the virtual address range includes a difference between the virtual address and the maximum virtual address.

31. The apparatus as recited in claim 25, wherein the information relates to a physical address range and includes a minimum physical address.

32. The apparatus as recited in claim 31, wherein the information relating to the physical address range includes a difference between the physical address and the minimum physical address.

33. The apparatus as recited in claim 25, wherein the information relates to a physical address range and includes a maximum physical address.

34. The apparatus as recited in claim 33, wherein the information relating to the physical address range includes a difference between the physical address and the maximum physical address.

35. The apparatus as recited in claim 25, and further comprising logic for determining if a later virtual address is within a virtual address range associated with the information.

36. The apparatus as recited in claim 35, and further comprising logic for accessing the page table entry data structure again when the later virtual address is not within the virtual address range, and logic for using the information when the later virtual address is within the virtual address range.

37. A method for minimizing a number of look-ups in a page table entry data structure during mapping of a virtual address to a physical address, comprising the acts of:
(a) accessing a virtual address in a page table entry data structure of a processing unit;
(b) determining whether the virtual address in the page table entry data structure has two or more contiguous physical addresses; and
(c) retrieving information relating to a virtual address range and a physical address range from the page table entry data structure.

38. The method as recited in claim 37, wherein the information relating to the virtual address range and the physical address range is retrieved from the page table entry data structure only upon determining that the virtual address in the page table entry data structure has two or more contiguous physical addresses.

39. A computer program embodied on a computer readable medium for minimizing a number of look-ups in a page table entry data structure during mapping to a virtual address to a physical address, comprising:
(a) a code segment for accessing a virtual address in a page table entry data structure of a processing unit;
(b) a code segment for determining whether the virtual address in the page table entry data structure has two or more contiguous physical addresses; and
(c) a code segment for retrieving information relating to a virtual address range and a physical address range from the page table entry data structure.

40. The computer program as recited in claim 39, wherein the information relating to the virtual address range and the physical address range is retrieved from the page table entry data structure only upon determining that the virtual address in the page table entry data structure has two or more contiguous physical addresses.

41. An apparatus for minimizing a number of look-ups in a page table entry data structure during mapping of a virtual address to a physical address, comprising:
(a) logic for accessing a virtual address in a page table entry data structure of a processing unit;
(b) logic for determining whether the virtual address in the page table entry data structure has two or more contiguous physical addresses; and
(c) logic for retrieving information relating to a virtual address range and a physical address range from the page table entry data structure.

42. The apparatus as recited in claim 41, wherein the information relating to the virtual address range and the physical address range is retrieved from the page table entry data structure only upon determining that the virtual address in the page table entry data structure has two or more contiguous physical addresses.

* * * * *